United States Patent [19]

Schreiner et al.

[11] Patent Number: 4,458,546
[45] Date of Patent: Jul. 10, 1984

[54] GEAR MECHANISM

[75] Inventors: Friedrich Schreiner, Kehlen-Ruete; Uwe Staberoh, Friedrichshafen, both of Fed. Rep. of Germany

[73] Assignee: Zahnradfabrik Friedrichshafen, AG, Friedrichshafen, Fed. Rep. of Germany

[21] Appl. No.: 331,227

[22] Filed: Dec. 16, 1981

[30] Foreign Application Priority Data

Dec. 24, 1980 [DE] Fed. Rep. of Germany ....... 3049101

[51] Int. Cl.³ .................... F16H 57/00; F16H 35/00; F16H 55/18; F16D 13/60
[52] U.S. Cl. ...................................... 74/410; 74/380; 74/392; 74/409; 192/110 B
[58] Field of Search ................. 74/331, 380, 384, 392, 74/397, 399, 409, 410, 398; 192/110 B, 110 S, 98

[56] References Cited

U.S. PATENT DOCUMENTS

| 2,014,138 | 9/1935 | Kuhns et al. | 74/410 |
|---|---|---|---|
| 2,982,144 | 5/1961 | Wallgren | 74/392 |
| 3,105,395 | 10/1963 | Perkins | 74/331 |
| 3,138,965 | 6/1964 | Brey et al. | 74/331 |
| 3,283,613 | 11/1966 | Perkins | 74/331 |
| 3,425,290 | 2/1969 | Perkins | 74/331 |
| 3,500,695 | 3/1970 | Keiser | 74/331 |
| 3,611,823 | 10/1971 | Richards | 74/331 |
| 3,910,131 | 10/1975 | Richards | 74/331 |
| 4,065,981 | 1/1978 | Whateley et al. | 74/331 |
| 4,104,928 | 8/1978 | Vandervoort | 74/331 |
| 4,106,358 | 8/1978 | Morrison | 74/331 |
| 4,226,135 | 10/1980 | Winter | 74/331 |
| 4,344,517 | 8/1982 | Nakamura et al. | 192/110 B |

FOREIGN PATENT DOCUMENTS

| 380178 | 7/1919 | Fed. Rep. of Germany . |
| 1031075 | 3/1953 | Fed. Rep. of Germany . |
| 2419673 | 11/1974 | Fed. Rep. of Germany . |

Primary Examiner—Lawrence J. Staab
Assistant Examiner—Bruce F. Wojciechowski
Attorney, Agent, or Firm—Karl F. Ross; Herbert Dubno

[57] ABSTRACT

A load-splitting transmission has its drive shaft journaled with respect to the housing in an axial bearing and supported only by a radial bearing forming part of the clutch connecting said drive shaft to the output shaft of an engine so that the axis of the drive shaft is swingable relative to the housing. The drive shaft carries a drive gear which meshes with a pair of load-splitting gears so that the swinging movement allows torque compensation between the two drive trains of which the load-splitting gears are a part.

5 Claims, 6 Drawing Figures

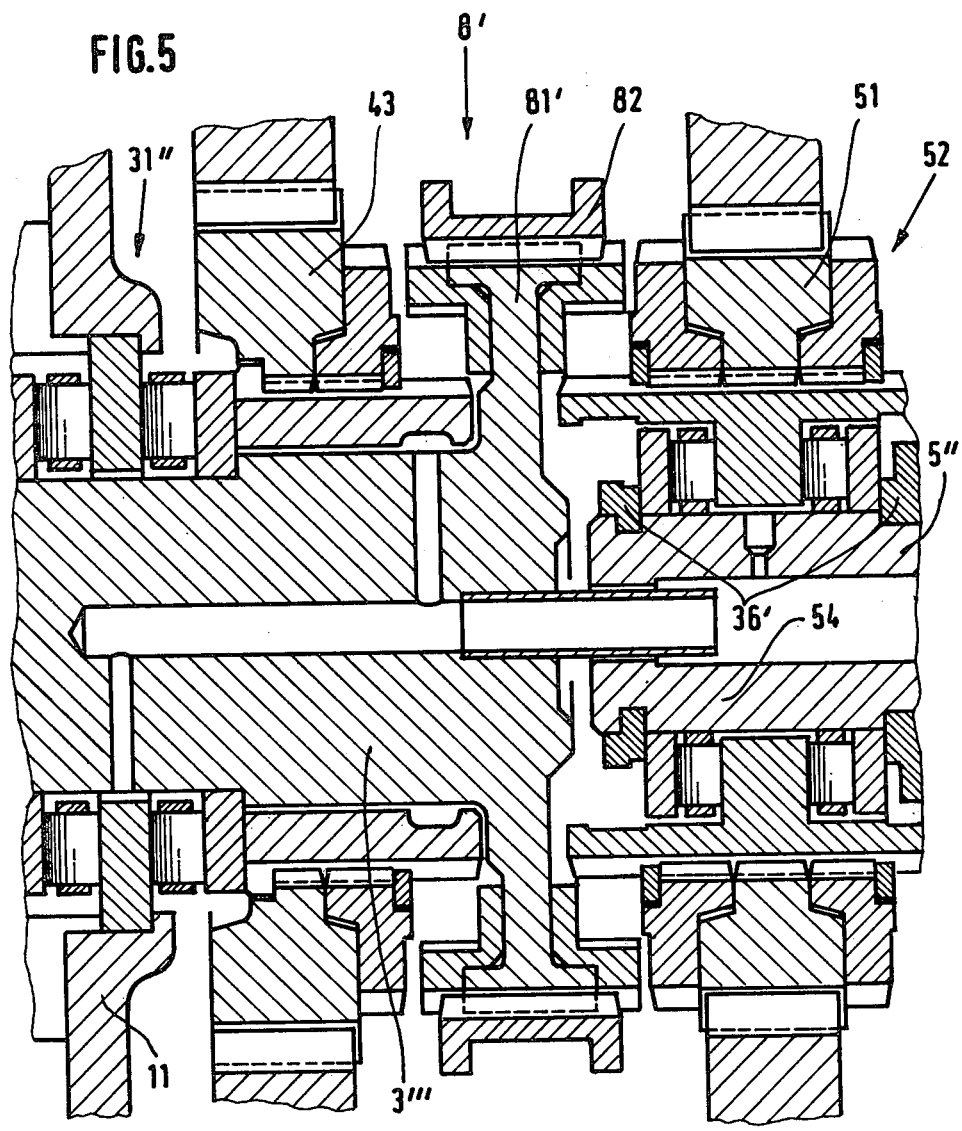

GEAR MECHANISM

FIELD OF THE INVENTION

The invention relates to a gear mechanism with power division via at least two countershafts and with a torque compensation (load compensation) in the region of the drive shaft. More particularly the invention relates to power division gearing in which change-speed gears form an integrated split group connected upstream with two possible drive gears. The second drive gear which is close to or on the output/main shaft may, as a second function, also be coupled with this output/main shaft.

BACKGROUND OF THE INVENTION

Gear mechanisms with power division, in which an input torque is divided along several paths, which only transmit in each case a portion of the input torque, enable compact gear constructions. The safety in operation, the noise behavior and the service life of a multiple path gear mechanism of this type are however to a large extent dependent on the maintenance in operation of the required ratio of the torque portions divided along the gear paths. As a result of deviations of the gear paths which are always present and are caused by production conditions, constructional measures for torque compensation are required which prevent the excessive loading of one of the gear paths.

For this purpose there is already disclosed in the German Auslegeschrift 10 31 075 a torque compensation in a gear mechanism in which the torque compensation takes place via the drive shaft in connection with the drive gear. In this publication the drive shaft is divided and comprises a first radially mounted and a second radially freely movable section, wherein the drive connection between the two sections of the drive shaft and to the drive gear takes place predominantly via two toothed clutches so that the drive gear may in this way freely move between the gears meshing with it on the countershaft, and may therefore move both perpendicularly to the axis and angularly on all sides. Therefore by setting the reaction pressure of the tooth pressure in such a way between the two gears on the countershaft, that the power may be uniformly transmitted to both gears and therefore an automatic compensation of the torque is obtained.

The compensation of torques using this or like constructions is complicated and leads to high construction costs, for example as a result of the two curved tooth clutches additionally necessary. Additional components however provide additional sources of failure. In addition they may not or may only be used with excessive cost for example with change-speed gears having an integrated split group connected upstream.

OBJECT OF THE INVENTION

The object of the invention is therefore to provide a gear mechanism such that the cost for the torque compensation is as low as possible, in particular avoiding the use of components which produce noise.

SUMMARY OF THE INVENTION

A gear mechanism of the type with which the inventor is concerned has a clutch connected upstream with a drive shaft and a main shaft (output shaft) disposed coaxially thereto and countershafts with gears disposed substantially symmetrically to the main shaft, which gears are driven with power division by the drive shaft via a drive gear, wherein the output takes place via the main or output shaft and the torque compensation is effected by the drive shaft and the drive gear, characterised by the features:

According to the invention the mechanism is improved by the following combinations of features:

the drive shaft is only radially mounted by a (radial bearing) in the flywheel of the clutch connected upstream of the gear mechanism, which flywheel is connected with the engine output shaft, this radial bearing in the flywheel or the fit between the radial bearing and the journal of the drive shaft and the bore in the flywheel has a relatively large play, the splined shaft coupling between the drive shaft and the boss of the clutch disc has a relatively large play, and a resilient connection is provided between the clutch disc and the boss.

A helical tooth gear mechanism of the invention is characterised by the features:

all the gears of the gear mechanism are helically toothed at least in the region of the drive shaft, and the drive shaft is in one piece and is only axially mounted in the gear housing for receiving the axial forces from the helical toothing.

Basically no further devices are required for the torque compensation in addition to the required constructional conditions for the gearing. It is only necessary to adopt specific conditions for the individual devices which are already present per se.

Modern, efficient gears are already designed, bearing in mind running characteristics and quietness with helical toothing for example in the case of change-speed gears for a vehicle drive at least for the area of forward travel in the high gears. The axial forces from the helical toothing must however be taken up by an axial bearing between the drive shaft and the housing, although for the actual torque compensation no bearing in the gear housing would in fact be necessary. It should be ensured that an easy radial pivoting movement is enabled. A suitable axial bearing must therefore be selected instead of the customary radial bearing. The drive shaft may be made in one piece in a simple manner as in the case of any other gears without power division.

In addition it is customary to mount the clutch connected upstream of the gear on the input shaft of the gear. For this purpose a radial bearing is disposed between the flywheel of the clutch or the engine output shaft and a journal on the input shaft. Tolerances which are already customary in the region of this bearing enable, as a result of the relatively large spacing from the drive gear in the gearing, an easy pivoting movement of this drive gear for the purpose of torque compensation.

This pivoting movement which may possibly be necessary is in addition unimpaired by the spline shaft toothing for example disposed between the boss of the clutch disc and the drive shaft. There is a very large spacing between the drive gear and this spline shaft toothing, and the tolerance in this clutch with respect to the resilient connection of the clutch disc with the clutch boss enables the pivoting movement effecting the torque compensation.

A further advantage is that all these characteristic features together or a large portion of these features, which do not necessitate further requirements in terms of cost, lead to a very easy torque compensation without impairing the quality of the gearing as a result of the planned tolerances—which in any case do not exceed those which are generally in use. This is shown in particular by very good running characteristics, a high degree of quietness and an almost optimum torque compensation as a result of this easy pivoting movement of the drive shaft and therefore of the drive gear.

A gear mechanism in which the drive pinion (drive gear) drives several gears on the countershafts and may be freely adjusted for the torque compensation is known from the German Patent Specification No. 380 178. In this publication the bearings for the drive shaft are spaced so far from one another that the elasticity of the drive shaft enables the free adjustment of the drive gear. In the case of modern gears these conditions do not provide an adequate torque compensation, as the possible spacing of the bearings and the diameter of the drive shaft required for other reasons do not allow this elasticity to arise.

In addition a freely adjustable drive gear which simultaneously drives several gear wheels on the countershafts is known from the German Auslegeschrift No. 24 19 673. In this publication the drive shaft is radially mounted in the gear housing and is connected with the drive gear via a curved tooth clutch, so that this gear may carry out a tumbler movement in order to achieve the torque compensation. This gear has helical toothing. However with this device it is not possible to achieve an easy and therefore adequate torque compensation with a normal helix of the helical toothing. Excessive angles of skew which could possibly produce a satisfactory torque compensation are however not possible as a result of other drawbacks. The cost of a device of this type is also comparatively high.

A further torque compensation for a gear mechanism is known from the U.S. Pat. No. 3,500,695 (German Offenlegungsschrift No. 19 42 179). In this publication the output/main shaft however pivots outwardly and devices must be provided at both ends of this shaft (first end-pivotable bearing; second end-free floating bearing). This device is in particular disadvantageous with change-speed gears as in the present invention. Furthermore the load compensation is dependent on the transmission.

BRIEF DESCRIPTION OF THE DRAWING

FIG. 2B being with torque compensation;

FIG. 5 shows a detail section from FIG. 3 with a possible drive gear on the drive shaft and on the main or output shaft respectively.

SPECIFIC DESCRIPTION

Figure 1:
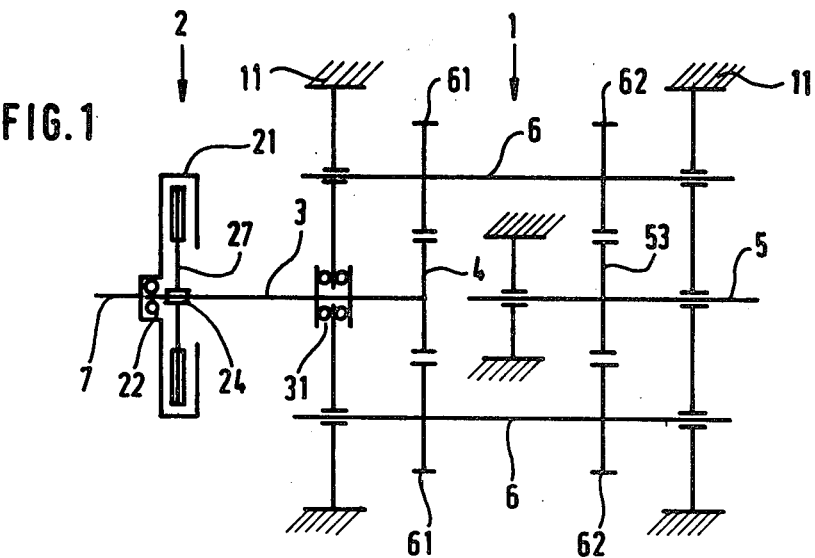
FIG. 1 is a diagrammatic illustration of a gear mechanism with torque compensation in accordance with the invention.

FIG. 1 shows a mechanism 1 having a clutch 2, wherein the driving torque is transmitted from the engine shaft 7 via the clutch 2 to the drive shaft 3. The drive gear 4 distributes the driving torque to the load-splitting gears 61 of the countershafts 6 and via the load-combining gears 62 and the output gear 53 the torque is again combined at the main shaft/output shaft. In the region of the mechanism 1 the input shaft 3 is only supported on the housing 11 via the axial bearing 31. The main/output shaft is dual mounted on the housing 11.

Figures 2A, 2B:
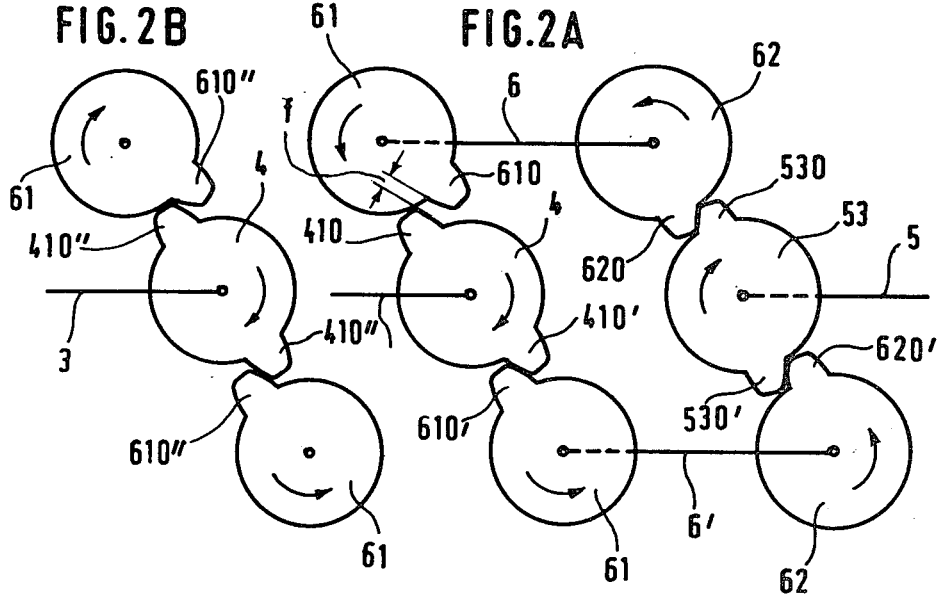
FIGS. 2A and 2B diagrammatically illustrate torque compensation by pivoting of the drive shaft, FIG. 2A being without torque compensation.

In FIG. 2A the comparatively different manufacturing variations lead to a tooth spacing f between the teeth 410 of the drive gear 4 and the teeth 610 of the gear on the countershaft if no torque compensation is possible. The entire driving torque is therefore transmitted via the teeth 410', 610' and the other countershaft 6' to the teeth 620°, 530° and therefore to the output shaft 5. The teeth 410, 610 and 620 and 530 and the countershaft 6 do not take any part in the torque transmission.

In FIG. 2B the drive shaft 3 may be pivoted and may therefore freely set the drive gear 4 on the countershafts under the action of the driving torque between the teeth 610" of the drive gears 61. The torque is therefore uniformly transmitted to the two gears 61. The outward pivot of the drive shaft 3 in this respect is a half of f so that the complete load compensation is obtained with a relatively small pivoting movement of the drive shaft.

Figure 3:
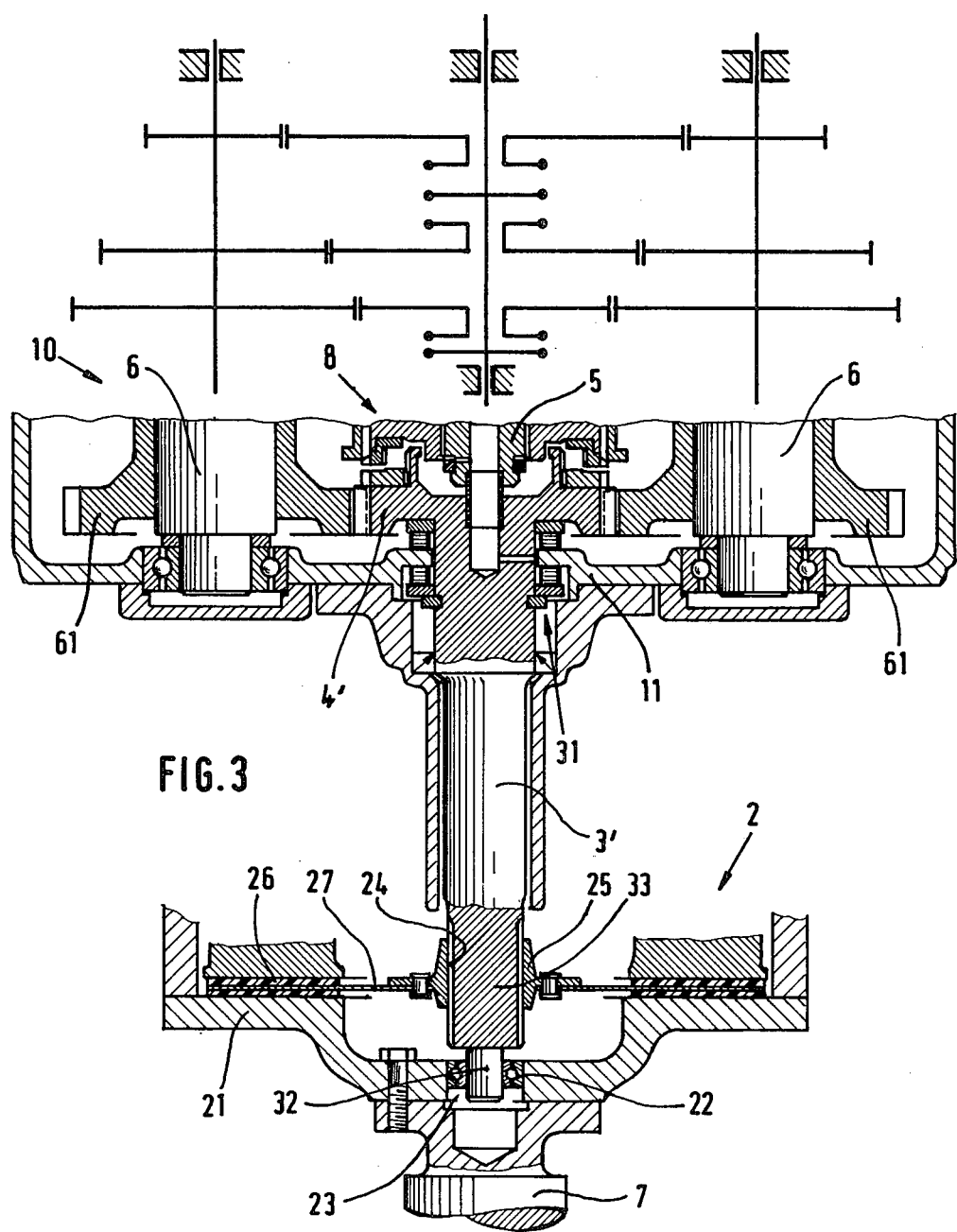
FIG. 3 is an axial section of an embodiment of a torque compensation system in the region of the drive shaft and the drive gear.

FIG. 3 shows a change-speed gear 10 with a clutch 2, wherein the region of the torque compensation is shown in detail and the remaining parts in diagrammatic form. The torque is transmitted via the engine output shaft 7 to the flywheel 21 of the clutch. If the clutch 2 is closed the clutch disc 26 is positively connected to the flywheel 21 and the torque is transmitted to the boss 25 and via the spline shaft coupling 24, 33 to the output shaft 3' with which the drive gear 4' for example is rigidly connected.

The drive shaft 3' is connected at the journal 32 to the flywheel 21 of the clutch 2 via a radial bearing 22. Mounting in the gear housing 11 is carried out via an axial bearing 31. The drive shaft 3' may perform a pivoting movement and the drive gear 4' may be completely freely adjusted under the action of the torque between the gears 61 on the countershafts 6. This is obtained:

by play in the radial bearing 22 and/or play between the radial bearing and the journal 32 of the drive shaft 3' and/or the bore 23 in the flywheel 21 of the clutch 2, by play in the spline shaft coupling 33, 24 between the boss 25 of the clutch disc 26 and the drive shaft 3' and/or the resilient connection 27 between the clutch disc 26 and the clutch boss 25, all the gears for the forward movement area, predominantly in the torque compensation area, may be helically toothed, as better running characteristics and reduced running noise are obtained in this way. The axial forces from the helical toothing of the drive gear 4' must however be supported by an axial bearing (bearing 31) preferably between the drive shaft 3' and the gear housing 11. The axial bearing 31 enables easy pivoting of the drive shaft 3' which may be provided in one piece.

The drive shaft 3' may be directly connected with the output shaft 5 via the switching clutch 8 so that the problem of torque compensation does not arise with this connection.

Figure 4:
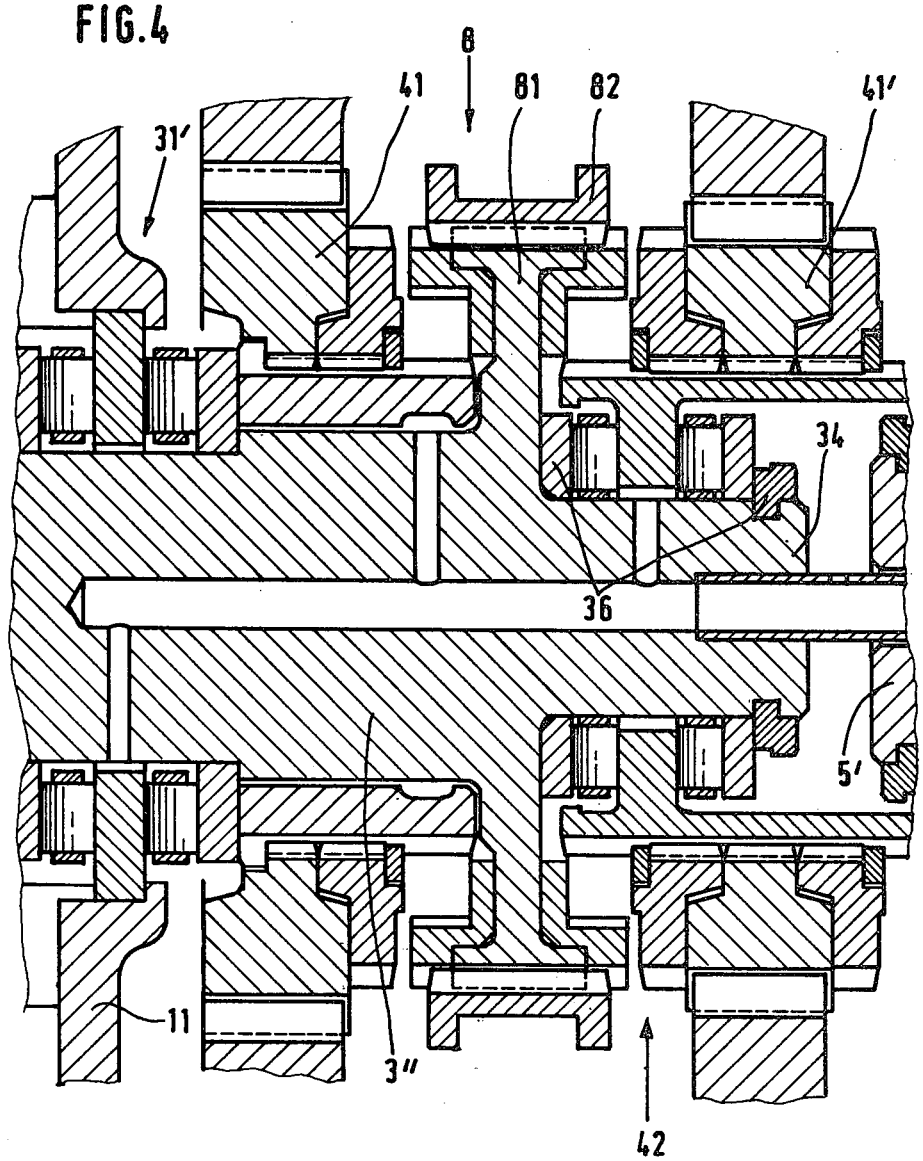
FIG. 4 shows a detail section of FIG. 3 with two possible drive gears on the drive shaft.

FIGS. 4 and 5 illustrate the use of the invention in a modern change-speed gear, wherein the power division may take place in two different transmissions—i.e. with two different drive gears 41, 41' on the drive shaft 3" (FIG. 4) or one drive gear 43 on the drive shaft 3"' and one drive gear 51 on the output/main shaft 5 (FIG. 5).

In both cases the sliding sleeve support 81, 81' is rigid with or connected in a rotationally and axially fixed manner with the input shaft 3", 3'''. The respective first drive gear 41, 43 is also mounted on the drive shaft 3", 3''', and the axial bearing 31', 31" for the drive shaft 3", 3''' is disposed such that the first drive gear 41, 43 is also axially supported on the housing 11 and performs the pivoting movement together with the drive shaft 3", 3'''.

In FIG. 4 the second drive gear 41' is disposed in a rotatable, axially fixed and radially displaceable manner on a second journal 34 of the drive shaft 3", wherein an axial bearing 42 ensures easy movement with respect to rotation and radial displacements.

In accordance with FIG. 5 the second drive gear 51 is disposed in a rotatable, axially fixed and radial displaceable manner on a journal 54 of the output/main shaft 5", wherein an axial bearing 52 ensures easy movement with respect to rotation and radial displacements.

If both drive gears 41, 41' are disposed on the drive shaft 3", it is possible by means of the switching clutch 8 to convey the torque via the sliding sleeve support 81 from the drive shaft 3" with the sliding sleeve 82 to either the first 41 or the second 41' drive gear. The torque may then be uniformly distributed from both drive gears to the gears of the countershafts as a result of the features described above relating to the load compensation. If the first drive gear 41 is used for the power division, the second drive gear 41' may be connected via a second switching clutch (not shown) to the output/main shaft. In particular in the case of switching of this type the axial bearing 42 between the drive shaft 3" and the second drive gear 41' enables comparatively reliable load compensation of the first drive gear 41 as a result of the unhindered pivotability of the drive shaft. This embodiment is further advantageous in particular as in the case of loading there is only a relative speed for the bearing 42 and the switched gears may not have any effect on this relative speed.

In accordance with FIG. 5 it is also possible to switch to either the first drive gear 43, which is mounted on the drive shaft 3''', or to the second drive gear on the main-/output shaft (journal 54) via the switching clutch 8'. If load compensation takes place via the second drive gear 51, the axial bearing 52 enables the pivoting movement of the drive shaft 3''' with the coupled second drive gear 51.

In accordance with this embodiment the second drive gear 51 may also be connected to the output/main shaft 5 via a second switching clutch (not shown) and has no effect on the pivoting movement of the drive shaft 3''' with the first drive gear 43 as a result of its mounting on the output/main shaft (journal 54).

The axial bearings (31, 31', 31", 42, 52) are not limited to the embodiments shown in FIGS. 3 to 5, but may also be embodied for example as slide or ball bearings.

We claim:

1. A gear mechanism with load division, comprising in combination:
   a housing:
   a drive shaft extending into said housing;
   an axial bearing journaling said drive shaft on said housing;
   a clutch having an input shaft connected to a rotary power source and a flywheel driven by said input shaft and adapted to entrain said drive shaft while being journaled on a radial bearing so that the sole journaling of said drive shaft is effected by said radial bearing and said axial bearing, whereby the axis of said shaft is swingable relative to said housing;
   a drive gear adapted to be entrained by said drive shaft and located within said housing;
   a pair of load-splitting gears meshing with said drive gear in said housing;
   respective load-combining gears rotatably entrained by said load-splitting gears;
   an output gear meshing with said load-combining gears in said housing; and
   an output shaft connected to said output gear in said housing and axially aligned with said drive shaft, said drive shaft and said bearings being constructed such that the swing of said axis effects take-up of play between the teeth of said drive gear and said load-splitting gears thereby effecting torque combination between power trains formed by each torque-splitting gear and the respective torque-combining gear.

2. The mechanism defined in claim 1 wherein said drive shaft is formed with a coupling sleeve selectively engageable with said drive gear and at least one other gear.

3. The mechanism defined in claim 2 wherein said other gear and said drive gear are both mounted on said drive shaft.

4. The mechanism defined in claim 2 wherein said drive gear is mounted on said drive shaft and said other gear is mounted on said output shaft.

5. The mechanism defined in claim 4 wherein said output shaft is journaled with respect to said drive shaft via a further axial bearing.

* * * * *